Feb. 24, 1948. W. R. FLATFORD ET AL 2,436,511
RADIATION ABSORPTION CELL FOR OPTICAL TESTING APPARATUS
Filed Sept. 7, 1943 3 Sheets-Sheet 1

INVENTORS
F. W. CRAWFORD
W. R. FLATFORD
BY Hudson Young & Yinger
ATTORNEYS

Feb. 24, 1948.    W. R. FLATFORD ET AL    2,436,511
RADIATION ABSORPTION CELL FOR OPTICAL TESTING APPARATUS
Filed Sept. 7, 1943    3 Sheets-Sheet 2

INVENTORS
F. W. CRAWFORD
W. R. FLATFORD
BY Hudson Young & Yinger
ATTORNEYS

Feb. 24, 1948. W. R. FLATFORD ET AL 2,436,511
RADIATION ABSORPTION CELL FOR OPTICAL TESTING APPARATUS
Filed Sept. 7, 1943 3 Sheets-Sheet 3

INVENTORS
F. W. CRAWFORD
W. R. FLATFORD
BY Hudson Young & Yinger
ATTORNEYS

Patented Feb. 24, 1948

2,436,511

UNITED STATES PATENT OFFICE 2,436,511

RADIATION ABSORPTION CELL FOR OPTICAL TESTING APPARATUS

William R. Flatford and Francis W. Crawford, Bartlesville, Okla., assignors to Phillips Petroleum Company, a corporation of Delaware Application September 7, 1943, Serial No. 501,506

4 Claims. (Cl. 88—14)

This invention relates to spectrophotometry and it has particular relation to apparatus used in holding and manipulating cells containing fluids to be tested and comparison cells.

It has been found that different fluids respond differently to the transmission of light of different wave lengths. For example, water absorbs some light in the infra-red but transmits visual light freely whereas benzene absorbs the light heavily in the ultra-violet end of the spectrum. Each chemical substance has an individual response and by plotting absorption curves with light wave length as one axis and percent absorption as the other axis the exact chemical identity of the substance being tested may be discovered although no other method might reveal what it is. The absorption spectrum or the Raman spectrum may be used. Mixtures of two compounds too close in nature to be chemically or physically separated may have their percentages of respective components revealed by spectrophotometry.

The devices of the prior art have proved to be unequal to the problem of dealing with an opaque liquid, or one having a relatively low boiling point especially those of a hydrocarbon nature. The usual square quartz cell is too thick for opaque liquids and they have to be diluted with a suitable solvent. This dilution with the solvent is too uncertain as the small quantity involved makes it difficult to measure the exact percentage of dilution and the purity of the solvent must be carefully tested. With a volatile liquid the material may be lost before it can be analyzed. No simple apparatus for handling gases or liquids exists. If the Baly tube of the prior art is used, the rubber seal is soon destroyed by the compounds being tested, such as hydrocarbons, and small parts of the rubber seal will dissolve and enter the test chamber in the tube and spoil the accuracy of the test results, or if the hydrocarbon must be confined under pressure there are difficulties with leakage as the Baly tube will not retain liquids under any substantial pressure.

It is also known that the absorption of a fluid varies with the pressure and temperature of the fluid, so control of the pressure as well as the temperature is regarded as important.

One object of our invention is to overcome these objections to the prior art by providing apparatus which will handle all types of fluids in its absorption cells.

Another object is to provide a practical instrument to solve practical problems in the industrial application of spectrophotometry to analyses for plant control.

Another object is to provide a set of absorption cells that can be used effectively with minimum chance for errors by personnel not so highly skilled as graduate technicians without sacrifice of precision.

Another object is to provide apparatus by which the operator will be able to analyze either liquid or gaseous substances at will without loss of time.

Another object is to provide a cell in which the pressure may be varied so that volatile fluids may be kept in liquid phase, or a partial vacuum created over the liquid, or the fluid may be tested as a compressed or a rarefied gas.

Numerous other objects and advantages will be apparent to those skilled in the art upon reading the following specification, studying the drawings and reading over the claims of this application.

Figures 2, 3:
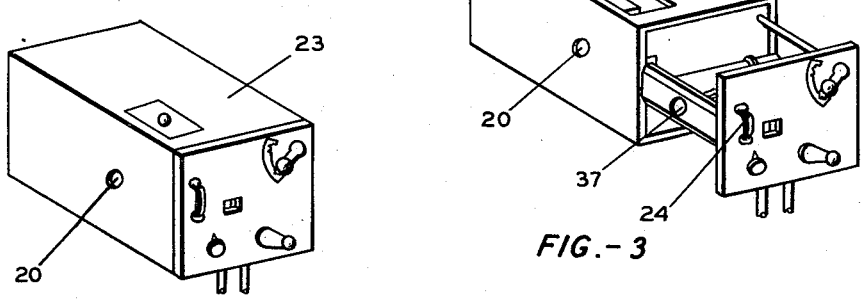
Figure 2 is a perspective view of our absorption cell magazine with the telescoping absorption tube in operative position.
Figure 3 is a view similar to Figure 2 in which the vertically sliding fixed volume cells are in operative position, and with the hatch removed to give access to these cells.

As shown in Figure 2 and Figure 3 there are two positions of operation of our absorption cell. In Figure 2 light from a spectrum producing light unit (such as that of a Beckman ultra-violet spectrophotometer) is directed through orifice 20. In the position of Figure 2 the light entering orifice 20 passes through the telescopic tube 21 of Figure 4 and emerges through orifice 22 where it goes to a photometer (such as the photometer supplied with the Beckman ultra-violet spectrophotometer).

Figure 9:
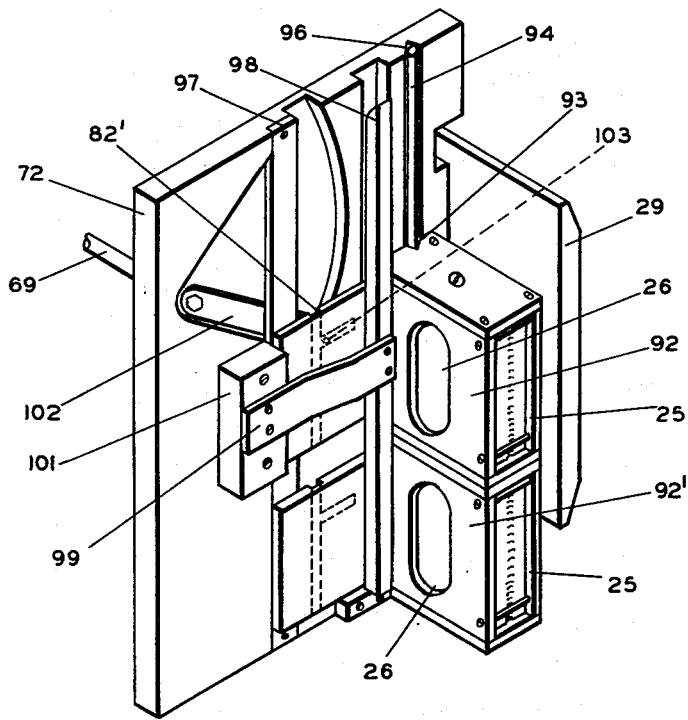
Figure 9 is a a perspective view showing the assembly and operation of the liquid cells with all unrelated parts removed for clarity.

When the absorption cell 23 is held still and handle 24 is pulled, the apparatus moves from the position of Figure 2 to that of Figure 3 and in that case, the light entering orifice 20 passes through whichever liquid cell 25 in Figure 9 is positioned in front of the orifice, the light passing through hole 26 in the back of the cell and out through orifice 22 to the photometer (not shown).

Figure 4:
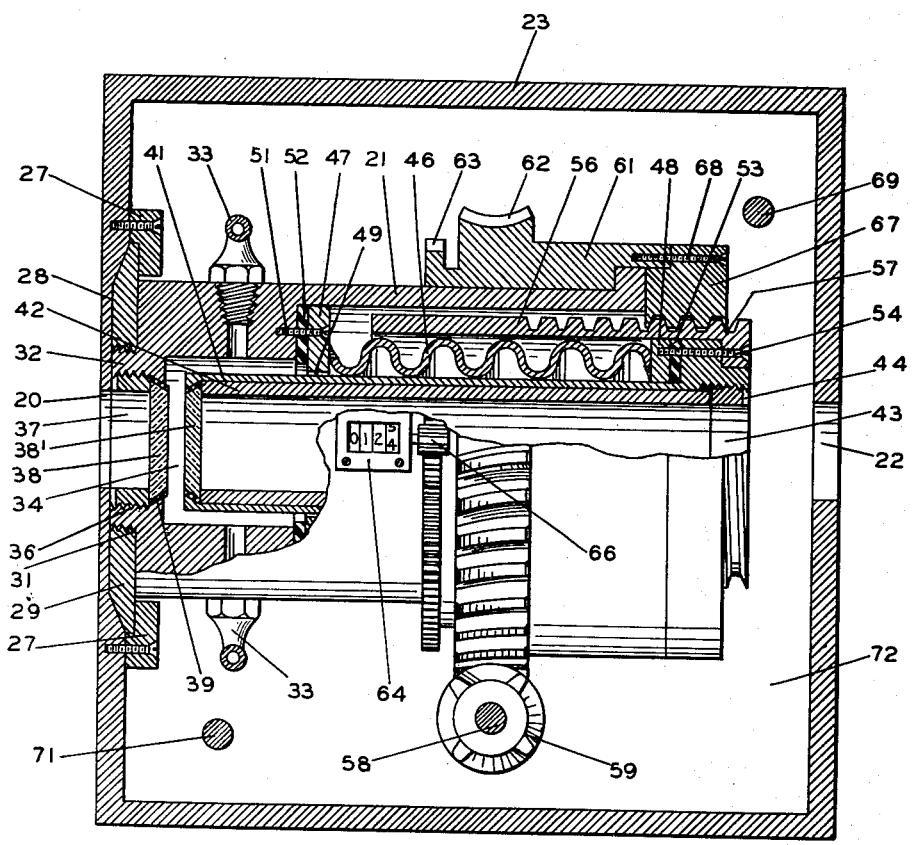
Figure 4 is a cross sectional view taken along a vertical plane through the axis of the telescoping absorption tube, with the exception that substantially the lower front quarter of the tube is not in section, parts being broken away.

Describing the apparatus in the position of Figure 2, attention is directed to Figure 4 in which a telescoping absorption cell 21 of a particularly novel and valuable construction forms a part of our invention. This cell is adapted to handle gases or liquids under pressure or vacuum.

Case 23 is a box-like structure having like orifices 20 and 22 formed therein and having horizontal tracks 27 placed above and below the orifice 20; the housing 23 being chamfered to form a channel 28. Sliding horizontally in channel 28 and guided by tracks 27 is a supporting frame arm 29 on which the tube 21 is seated. The frame arm 29 is provided with a threaded opening 31 which receives the threaded nose 32 of the tube 21, the tube being screwed up firmly against the arm 29. The tube 21 is provided with upper and lower fluid conducting tubes 33 so that liquids, vapors and gases may be forced into space 34 and held in a liquid state therein if desired. Valves 128 and 129 control the flow in tubes 33.

The nose 32 is provided with internal screw threads 36 into which a ferrule sleeve 37 may be screwed to hold quartz plate 38 in place. Quartz plate 38 is frusto-conical in shape and has a band of lead amalgam 39 around its periphery sealing it to the tube 21.

A movable tube 41 is similarly provided with a quartz window 38' of frusto-conical shape having lead amalgam around its periphery. Window 38' is held in tube 41 by concentric internal tube 42 and tube 42 is secured in tube 41 by screw sleeve ferrule 43. Sleeves 37 and 43 are provided with engagement slots 44 by which they may be adjusted.

The seal for chamber 34 between tube 21 and tube 41 is completed by means of metallic bellows 46 which is made out of thin steel. We may employ a 0.005 inch "Rex" bellows made of S. A. E. 18–8 steel, but any suitable bellows may be used. A metal bellows is preferred but other types of material not attacked by the organic liquids tested could be employed. Bellows 46 is welded to rings 47 and 48. Ring 47 fits snugly against tube 21 and ring 47 is provided with small triangular apertures 49 to allow passage of fluid between the ring and tube 41. Ring 47 is secured to tube 21 by screws 51, a lead amalgam gasket 52 supplying a seal between the parts. A similar fluid seal between ring 48 and tube 41 is provided by lead amalgam gasket 53 and screws 54. Screws 54 have the additional function of securing a drive sleeve 56 to tube 41. Drive sleeve 56 is provided with threads 57. A shaft 58 has a very steep pitched worm 59 keyed thereto and drives sleeve 61 by means of worm wheel teeth 62 machined therein. The particular type of gear teeth employed to drive sleeve 61 is believed immaterial to our invention.

While sleeve 61 may be made in several parts assembled by shrinking or other means we have shown it in one piece for simplicity, and formed on sleeve 61 we have shown a gear 63. A revolution counter 64 is provided with a gear 66 on its drive shaft meshing with gear 63. By a proper adjustment of gear sizes the numbers on the revolution counter may be made to be exact units of distance between the quartz plates 38 and 38'. We prefer to have this plate distance measured in thousandths of an inch but of course any units may be employed.

Sleeve 61 is secured to a screw sleeve 67 by screws 68. The screw sleeve 67 has internal screw threads complementary to threads 57. Tube 21 being held from rotation by arm 29 and being connected non-rotatably to tube 41 by bellows 46 it will be seen that rotation of rod 58 will turn sleeves 61 and 67 and force sleeve 56 and with it tube 41 (which is secured to sleeve 56 by screws 54) in and out varying the distance between windows 38 and 38'.

Rods 69 and 71 are rotatably supported in the back wall 72 of Figure 4. These rods will be described later.

In Figures 5 to 8 is shown the preferred method of construction of our preferred liquid cells.

Figure 5:
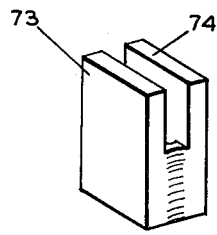
Figure 5 is a perspective view showing the first step in building up the liquid cell.

In Figure 5, two quartz plates 73 and 74 are spaced the desired distance apart and the front and rear adjacent edges are fused together. While the size of the cells is not part of the invention we may use quartz windows each 1/8 inch by 1/2 inch by 1 inch. In this manner a square tubular cell 78 is created having an internal space 79, the thickness of the quartz plates 73 and 74 being preferably the same as plates 38 and 38' of Figure 4.

Figures 6, 7:
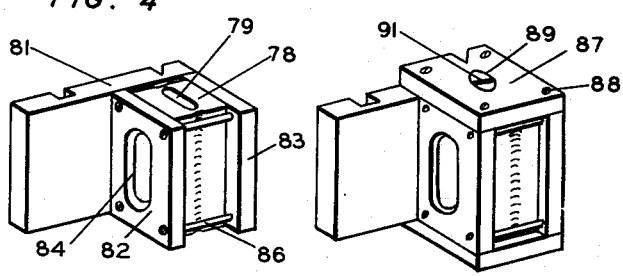
Figure 6 is a perspective view showing the first step in assembling the cell.
Figure 7 is a perspective view showing the same cell as Figures 5 and 6 after it is fully assembled.

Turning to Figure 6, we assemble the liquid cells by placing the quartz tube 78 in the angle of metal angle 81 and bringing up a metal plate 82. Plate 82 and end 83 of angle 81 both have oval holes 84 therein and the light passes through these holes 84 and through the quartz 78 in traversing the instrument.

Tube 78 is clamped between the plates 82 and 83 by screws 86.

The top and bottom of angle 81, plate 82 and quartz cell 78 are then ground off to a smooth flat surface and lead amalgam is applied to these top and bottom ground surfaces. As shown in Figure 7, end plates 87 are then secured by means of screws 88 to the top and bottom of the cells and are sealed thereto by the lead amalgam. The top end plate 87 is provided with a screw threaded opening 89 which is directly over opening 79 in cell 78. Opening 89 is closed by a screw threaded plug 91.

Figure 8:
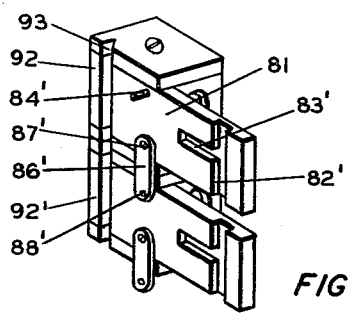
Figure 8 is a perspective view showing two of the cells detachably secured together as a unit.

Figure 8 shows the rear view of the cells as viewed in Figures 6 and 7. Two liquid cells 92 and 92' have been placed on top of each other. Plate 81 is provided with a vertical groove 82' which has a horizontal branch 83'. Grooves 82' and 83' will be explained later. The back of plate 81 also has a pin 84' projecting therefrom and a link member 86' is screwed to plate 81 by screw 87'. Link member 86' has a hole 88' for receiving pin 84' of the cell below and securing the cells together as a train for vertical movement together.

A V-shaped guide slot 93 is cut through end plates 87 and the back of angles 81 from top to bottom to provide a guide as will be described later.

Figure 9 shows how the cells 92 and 92' are assembled in the liquid cell portion of the apparatus. Arm 29 is provided with a window which is positioned in alignment with orifice 20 when the apparatus is in the position shown in Figure 3. As shown in Figure 9, cell 92 is in position and groove 93 is guided on rod 94 secured in guide groove 96. The cells 92 and 92' are held up against guide rod 94 and guide strip 97 by sled runner 98 which is urged toward plate 72 by spring 99. Spring 99 is secured to plate 72 by block 101 and the illustrated screws.

Rod 69 is non-rotatably secured to crank arm 102 and crank arm 102 has a pin 103 shown in dotted lines. As crank arm 102 is raised, pin 103 will move in slot 83' and carry the cells 92 and 92' upward until cell 92' is centered over orifice 20.

Figure 1:
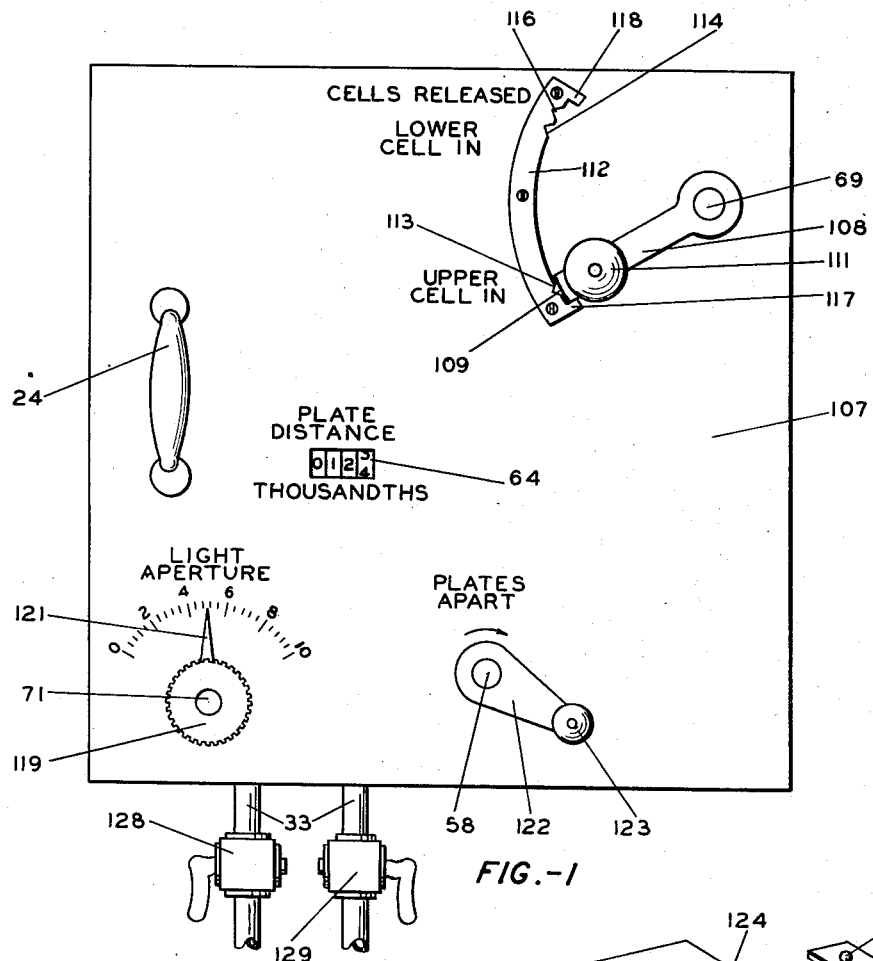
Figure 1 is an elevational view of one side of our absorption cell magazine showing the controls and with the fluid supply pipes broken away.
Figure 10:
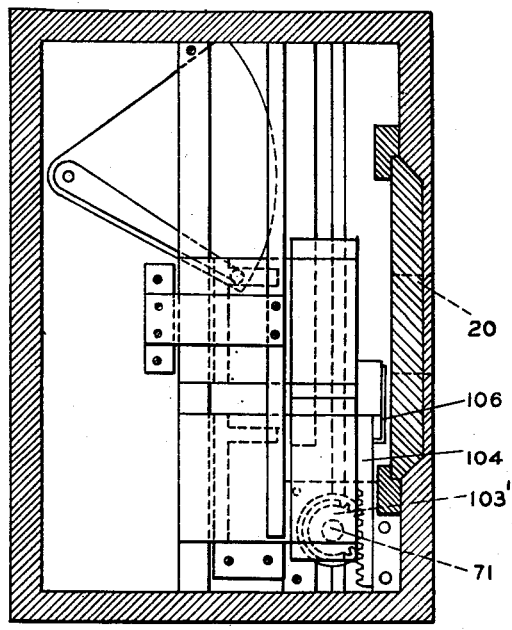
Figure 10 is a cross sectional view taken just inside the far wall of Figure 2 looking toward the near wall and showing the relationship of parts with a special reference to the light obscuring triangle and the rack and pinion for operating the same.
Figure 11:
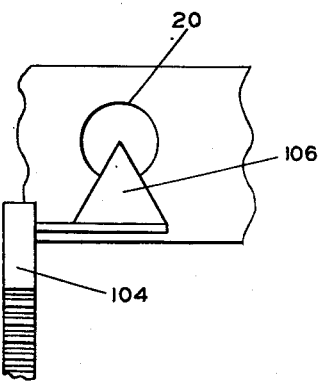
Figure 11 is a fragmentary view showing the light obscuring triangle and its relation to the light transmitting orifice.

In Figure 10, shaft 71 has non-rotatably mounted thereon a spur gear 103' engaged with rack 104. When rod 71 is turned, rack 104 moves up and down. Mounted on rack 104 is a triangular shaped opaque sheet metal wedge 106 and as shown in Figure 11 as rack 104 rises wedge 106 cuts off the light passing through orifice 20. In Figure 1 the ends of pipes 33 are shown as coming down between housing 23 and instrument panel plate 107. Space for these pipes 33 can be provided by making notches in housing 23, plate 107 or both. The various controls shown on the face of plate 107 are connected to the instrumentalities described as follows:

Crank arm 108 is keyed to rod 69 and may contain a spring pressed detent 109. An operating knob 111 is provided on the crank 108 and an arc 112 may be secured to panel 107 by screws. The arc 112 may be provided with recesses 113, 114 and 116 and stops 117 and 118 giving three positions to be described later.

The "Veeder" counter 64 reads through a hole in plate 107. Handle 24 is provided on the plate 107 for pulling the plate out. Rod 71 is non-rotatably secured to knob 119, which has non-rotatably secured to it a pointer 121 and a scale may be engraved on plate 107 as shown to indicate the position of wedge 106 of Figure 11.

Rod 58 is non-rotatably secured to crank arm 122 having an operating handle 123 thereon.

A hatchway 124 is provided in the top of housing 23 so that access to cells 92 and 92' may be provided. The hatchway is covered by a hatchway cover 126 which may be tapered or have some other construction to hold it flush with the top of 23, and it may be provided with a knob 127 for a handle.

The operation of the apparatus is as follows:

When the apparatus is in the position shown in Figure 2, the telescopic cell 21 of Figure 4 is lined up with apertures 20 and 22 so that the light passing to the photometer from the spectrum producer passes through the telescopic cell. We preferably use any liquid or gas in the telescopic cell without using any solvents to decrease its opacity as the thickness of the fluid can be varied by turning handle 123 and the distance between plates 38 and 38' may be read in thousandths of an inch at 64. The liquid or gas must be one that may be volatilized or blown out of the telescopic tube by warm air. As a comparison cell, the telescopic tube might be used while empty but as the reading on the photometer may vary from time to time, we prefer to shift the device to the position shown in Figure 3 and use an empty liquid cell 92 (the quartz walls 73 and 74 of which are the same optical thickness as plates 38 and 38' of the tube 21) as a comparison cell.

When the comparison reading is made the device can be shifted quickly back from the position of Figure 3 to the position of Figure 2 and readings then taken with the telescopic tube 21.

When a liquid which does not vaporize readily is to be tested, we prefer to use the liquid cells 92 and 92'. One of these may be empty or may contain water or a normal paraffin hydrocarbon if ultra-violet light is being employed or carbon tetrachloride if infra-red light is employed. These standards of comparison set forth in this paragraph are all old.

When lever 108 is in the position shown in Figure 1, and the device is in the position shown in Figure 3, the upper cell 92 will transmit the light from orifice 20. When lever 108 is moved so that detent 109 enters notch 114, the lower cell 92' will be moved into that position and receive light from orifice 20. Figure 9 shows that pin 103 runs close to slot 82' in these positions, so by moving lever 108 a little further to notch 116 liquid cells 92 and 92' become released, as pin 103 is now in slot 82', and the operator can lift the two cells out of hatchway 124 the cells being secured together by link 86' of Figure 8.

Pipes 33 are provided with valves 128 and 129. Due to the strong construction utilizing the metal bellows 46 a considerable amount of pressure may be maintained in space 34 by forcing fluids into 33. In this way substances which would be volatile at a certain temperature may be kept at a temperature where they will be in liquid phase and thus be tested in our apparatus. And substances normally in the liquid phase can have the atmospheric pressure relieved so that they become gaseous for the purposes of the test.

Let the intensity of the light through the comparison cell be $I_c$ and the intensity of light through the sample containing cell be $I_s$ then the percent transmission T of the sample is:

$$T = \frac{I_s \times 100}{I_c}$$

It will now be apparent that we have accomplished the objects of our invention by providing a novel and useful construction and combination of parts. Obviously numerous changes in design and construction of parts, such as the use of other gaskets and sealing agents than lead amalgam, or the use of different gears than those shown, do not avoid the scope of our invention, the invention being limited in scope only by the following claims.

Having described our invention, we claim:

1. In an optical testing apparatus, a radiation absorption cell comprising in combination an outer cylinder, a first transparent plate closing one end of the outer cylinder, an inner cylinder in telescoping relationship with the outer cylinder, a second transparent plate closing the corresponding end of the inner cylinder, a bellows sleeve connecting the opposite end of the inner cylinder to the outer cylinder, whereby an expansible fluid-tight chamber is formed with relatively movable transparent walls, means to move the plates together and apart, means to supply fluid to the chamber under suitable absolute pressure and means to indicate the distance between the plates.

2. In an optical testing apparatus, a radiation absorption cell comprising in combination an outer cylinder, a first transparent plate closing one end of the outer cylinder, an inner cylinder in telescoping relationship with the outer cylinder, a second transparent plate closing the corresponding end of the inner cylinder, a bellows sleeve connecting the opposite end of the inner cylinder to the outer cylinder, whereby an expansible fluidtight chamber is formed with relatively movable transparent walls, means to move the plates together and apart and means to supply fluid to the chamber under suitable pressure.

3. In an optical testing apparatus, a radiation absorption cell comprising in combination an outer cylinder, an internally threaded nut rotatably mounted on said outer cylinder to rotate about the axis of said outer cylinder, a first transparent plate closing one end of the outer cylinder, an intermediate externally screw threaded cylinder extending into said outer cylinder and threaded into said nut, an inner cylinder secured inside said intermediate cylinder, a second transparent plate closing one end of said inner cylinder, and a metal bellows disposed between said intermediate cylinder and said inner cylinder with the ends of said bellows hermetically sealed to said outer and inner cylinders respectively whereby an expansible fluidtight chamber is formed with relatively movable transparent walls, means to supply fluid to the chamber under suitable pressure, gearing to rotate said nut, and a counter geared to said nut, to indicate the distance between said plates.

4. In an optical testing apparatus, a radiation absorption cell comprising in combination an outer cylinder, an internally threaded nut rotatably mounted on said outer cylinder to rotate about the axis of said outer cylinder, a first transparent plate closing one end of the outer cylinder, an intermediate externally screw threaded cylinder extending into said outer cylinder and threaded into said nut, an inner cylinder secured inside said intermediate cylinder, a second transparent plate closing one end of said inner cylinder, a metal bellows disposed between said intermediate cylinder and said inner cylinder with the ends of said bellows hermetically sealed to said outer and inner cylinders respectively whereby an expansible fluidtight chamber is formed with relatively movable transparent walls and means to supply fluid to the chamber under suitable pressure.

WILLIAM R. FLATFORD.
FRANCIS W. CRAWFORD.

REFERENCES CITED

The following references are of record in the file of this patent:

UNITED STATES PATENTS

| Number | Name | Date |
|---|---|---|
| 1,954,925 | Exton | Apr. 17, 1934 |
| 2,258,073 | Stevens | Oct. 7, 1941 |
| 2,051,317 | Sheard et al. | Aug. 18, 1936 |

FOREIGN PATENTS

| Number | Country | Date |
|---|---|---|
| 128,528 | Austria | June 10, 1932 |